J. A. THOMPSON.
RUST PROOFING OF IRON AND STEEL ARTICLES.
APPLICATION FILED NOV. 8, 1918.
1,318,027.
Patented Oct. 7, 1919.
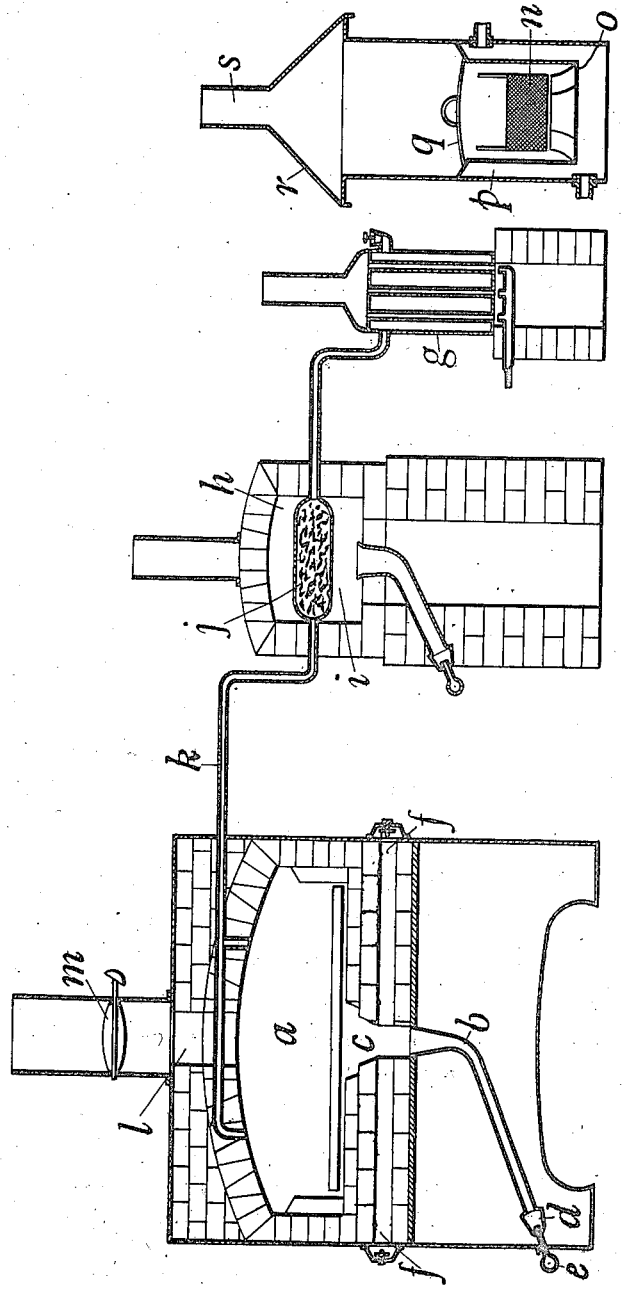
Inventor
J.A.Thompson.
By H.R.Kerslake
Atty

UNITED STATES PATENT OFFICE.

JACK ALEXANDER THOMPSON, OF SMETHWICK, ENGLAND, ASSIGNOR OF ONE-HALF TO GEORGE HENRY ALEXANDER, OF BIRMINGHAM, ENGLAND.

RUST-PROOFING OF IRON AND STEEL ARTICLES.

1,318,027.  Specification of Letters Patent.  Patented Oct. 7, 1919.

Application filed November 8, 1918. Serial No. 261,753.

*To all whom it may concern:*

Be it known that I, JACK ALEXANDER THOMPSON, a subject of the King of Great Britain and Ireland, residing at 58 Claremont road, Smethwick, in the county of Stafford, England, have invented certain new and useful Improvements Relating to the Rust-Proofing of Iron and Steel Articles, of which the following is a specification.

This invention relates to the formation of rust proof surfaces on articles of iron and steel. It has previously been proposed to treat such articles at a high temperature in an atmosphere of superheated steam for the purpose of forming on the same a surface of rust resisting oxid. The surface thus formed is not durable and usually lacks uniformity of quality, and articles of light construction are distorted due to the high temperature at which they are heated. By my present invention these defects are avoided.

The invention comprises a two-part process in the first of which the articles are heated for the formation thereon of a coating of oxid which is subsequently reduced to black or gray oxid by the conversion of the furnace atmosphere to a reducing atmosphere containing hydrogen produced by the decomposition of steam passed over hot iron or other material and carbon monoxid produced by the imperfect combustion of the furnace gases, the second part of the process consisting in immersing the articles while hot in a bath of hydrocarbon oil.

In the accompanying sheet of explanatory drawings, Figure 1 is a diagrammatic view of an oxidizing plant and Fig. 2 a diagrammatic view of a carbonizing plant constructed for carrying the process into effect.

In carrying the invention into effect a furnace chamber $a$ is heated by gas conveyed by a burner tube $b$ to a combustion space $c$. Air is admitted at $d$ to the burner tube where it mixes with the gas issuing from the supply pipe $e$. Additional or secondary air is admitted to the combustion space by passages $f$ in the base of the furnace. Hydrogen is produced by passing steam over iron scrap or other material which at a suitable temperature is capable of decomposing the steam and combining with its oxygen content. The steam is generated in a gas heated or other tubular boiler $g$ and conveyed to a decomposing chamber $h$ surrounded by a gas furnace $i$ and packed with pieces of scrap iron $j$. From $h$ the hydrogen passes by a pipe $k$ to the upper part of the furnace $a$. The hydrogen thus formed mixes with the products of combustion in the furnace chamber containing the articles to be treated. Escape for the gases is provided by a flue $l$ controlled by a damper $m$. The proportions of air and gas and the rate of escape from the furnace are so adjusted that a strong reducing atmosphere is obtained.

When the furnace is opened for the insertion or withdrawal of the articles air is admitted. This air serves to produce on the articles surfaces consisting of the higher oxids and by the action of the heat the surfaces of the articles are thoroughly cleansed. Subsequently the atmosphere of the furnace is changed to a reducing one and by the action of the reducing gases the oxid surface is reduced to black oxid or ferrosoferric oxid of iron.

Any convenient fuel may be employed for heating the furnace. Instead of gas, solid or liquid fuel may be used. The temperature to which the articles are raised is from $350°$ centigrade to $650°$ centigrade for steel articles and from $350°$ centigrade to $750°$ centigrade or higher for cast iron articles. The articles are placed in the furnace when these temperatures are reached. After the furnace has been closed a copious supply of hydrogen is introduced as and for the purpose described.

The articles are allowed to remain until uniformly heated, or longer if desired. The most satisfactory duration is readily found by experiment, but the time is never long enough to permit complete reduction of the oxid. While hot the articles are transferred to a bath (Fig. 2) of carbonizing material. The bath is contained in a tank $o$ surrounded by a water jacket $p$ through which a continuous stream of cooling water is passed. The tank may be covered by an asbestos lined lid $q$ and is surmounted by a detachable hood $r$ fitted with an outlet $s$ for fumes. Preferably the articles are placed in a perforated basket $n$ for convenience in withdrawing from the bath.

The bath may consist of an organic oil such as whale, fish, linseed, or cotton seed oil, or other hydrocarbon oil.

The carbonizing treatment renders oxid surfaces more durable and by preventing scaling preserves the required uniformity of the surfaces. Further it improves the resistance of the metal to the corroding action of external moisture.

The invention is not limited to any particular construction of heating and carbonizing apparatus as these may be varied to meet different requirements.

Having thus described my invention what I claim as new and desire to secure by Letters Patent is:—

In the formation of rust proof surfaces on iron and steel articles, a two-part process in the first of which the articles are heated in a gas fired furnace in an atmosphere primarily containing oxygen for the formation on the articles of a coating of oxid, this coating being subsequently reduced to black or gray oxid by the conversion of the furnace atmosphere to a reducing atmosphere containing hydrogen produced by the decomposition of steam passed over hot iron or other material, and carbon monoxid produced by the imperfect combustion of the furnace gases the second part of the process consisting in immersing the articles while hot in a bath of hydrocarbon oil, substantially as described.

In testimony whereof I have signed my name to this specification.

JACK ALEXANDER THOMPSON.